United States Patent [19]
Ottenheym et al.

[11] 3,931,002
[45] Jan. 6, 1976

[54] PROCESS FOR REMOVING HEAVY METALS FROM SOLUTIONS

[75] Inventors: Johannes H. Ottenheym, Sittard; Bernardus H. N. Dassen, Kerkrade, both of Netherlands

[73] Assignee: Stamicarbon B.V., Geleen, Netherlands

[22] Filed: June 18, 1973

[21] Appl. No.: 370,592

[30] Foreign Application Priority Data
June 17, 1972 Netherlands.................... 7208321
May 1, 1973 Netherlands.................... 7306014
May 17, 1973 Netherlands.................... 7306862

[52] U.S. Cl.................. 210/24; 210/38; 260/123.7
[51] Int. Cl.$^2$.. B01D 15/00; C02B 1/42; C07G 7/00
[58] Field of Search............. 210/38, 24; 260/123.7

[56] References Cited
UNITED STATES PATENTS
3,255,172   6/1966   Krajewski et al............... 260/123.7
3,725,261   4/1973   Friedman............................. 210/38

OTHER PUBLICATIONS
Chem. Abstracts, Vol. 75, 1971, 141805b, Robbins.
Chem. Abstracts, Vol. 67, 1967, 44693r, Peters.
Chem. Abstracts, Vol. 72, 1970, 101826r, Cain.
Chem. Abstracts, Vol. 70, 1969, 107447y, Calin.

*Primary Examiner*—Frank A. Spear, Jr.
*Assistant Examiner*—Ferris H. Lander
*Attorney, Agent, or Firm*—Cushman, Darby & Cushman

[57] ABSTRACT

A process for removal of heavy metals from solutions or gaseous mixtures is disclosed, wherein the solutions or gaseous mixtures are contacted with a suitable sulphur-containing reagent consisting of:
  a. reduced keratin,
  b. Bunte salts of keratin,
  c. natural or synthetic polyamides at least part of whose amide groups has been replaced by thio-amide groups, whereupon the loaded reagent is separated off.

The process is suitable for the purification of waste water, whose discharge on the surface waters is objectionable.

3 Claims, No Drawings

PROCESS FOR REMOVING HEAVY METALS FROM SOLUTIONS

The invention relates to a process for removing heavy metals from solutions or gaseous mixtures by contacting these solutions or mixtures with a suitable, sulphur-containing reagent, whereupon the loaded reagent is separated off. The term 'solutions or gaseous mixtures' here also comprises suspensions, emulsions and other dispersions.

Effective removal of heavy metals from solutions sometimes offers problems. Often, the use of strongly acid or strongly basic ion exchangers will not suffice, because these not only have an affinity towards the ionic, heavy-metal compounds to be removed, but also towards a few other ionic compounds occurring in the solution. Also adsorption of the heavy metals to active carbon or silica yields poor results. The resin known from the German Patent application No. 2,128,892, obtained by condensation of an aldehyde with thiourea, thiosemicarbazide or thiocarbazide, is expensive in use. From the German Patent application No. 2,027,276 it is known that copolymers of cellulose or of synthetic polymers and polyacrylic acid thioamide may be applied for removing mercury ions and ions of precious metals from an aqueous solution. Other important metals, like copper, nickel and cobalt, are not bound by this copolymer, which limits the field of application.

The object of the invention is to provide a process for removing heavy metals from aqueous solutions or gaseous mixtures in which the above-mentioned objections are avoided.

According to the invention these metals are removed by binding them to a sulphur-containing reagent, in which as reagent a treated natural or synthetic polyamide is applied. The invention, therefore, relates to a process for removing heavy metals from solutions or gaseous mixtures by contacting these solutions or mixtures with a suitable sulphur-containing reagent, whereupon the loaded reagent is separated off, the process being characterized in that the metals are bound to a treated natural or synthetic polyamide in the form of:
 a. reduced keratin;
 b. Bunte salts of keratin;
 c. natural or synthetic polyamides at least part of whose amide groups has been replaced by thioamide groups.

The reduced keratin to be used in the process according to the invention can be prepared by reducing wool in a known way (see, for instance, Austr. J. Biol. Sci., 21 (1968), 805) with a suitable agent, for instance a tertiary phosphine, like tri-n-butylphosphine, or a thiol, such as thioglycolic acid, 2-mercaptoethanol or toluene-ω-thiol. Cheap kinds of wool, for instance belly wool, are well useable. Also recovered, old wool is applicable. These are cheap materials which, after reduction, have a large adsorption capacity for the heavy metals. Besides from wool, the adsorbent can also be obtained from other material consisting wholly or partly of keratin, like hair, horn, such as neat's horn, skin or fowl's feathers. Especially chicken-feathers, of which large quantities are being produced and for which insufficient possibilities of application are known, are attractive on the basis of economic considerations. Reduced keratin is also understood to mean reduced, modified keratin and similar materials, for instance reduced carboxymethylkeratin.

It is possible for the reduction to be carried out in such a manner that the fibre-structure of the wool is preserved. This is of advantage to the application of the process according to the invention, since a strong permeable keratin bed can then be formed through which the solution to be treated can be passed well. Tri-n-butylphosphine and toluene-ω-thiol are suitable reduction agents in case one wants to retain the structure of the wool. Also, the solution to be treated may be mixed with the reduced keratin, by stirring. It may prove necessary for the material which contains the natural keratin to be degreased prior to being subjected to the reduction.

It is also possible to convert the keratin into so-called Bunte salts.

To this end, in an aqueous medium and with the aid of sulphite ions the keratin is split up and converted into Bunte salts, in which an oxidant is employed to cause the reaction to run to completion.

The reaction is a process known by itself, see Clarke, H. T., J. Biol. Chem. 97, 235 (1932), but it has not yet been applied, starting from keratin, for binding heavy metals from solutions or gaseous mixtures. The reaction is based on the equation:

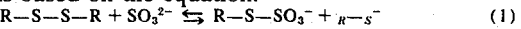
$$R-S-S-R + SO_3^{2-} \rightleftharpoons R-S-SO_3^- + R-S^- \qquad (1)$$

Complete conversion of the disulphide into the corresponding Bunte salts is possible if the thiolate formed intermediately is ever again converted into disulphide by oxidation according to the equation:

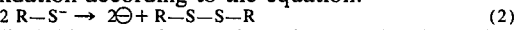
$$2 R-S^- \rightarrow 2\ominus + R-S-S-R \qquad (2)$$

The disulphide now formed is again capable of reacting with sulphite ions.

As an oxidant use may be made of oxygen, for instance atmospheric oxygen, but also other suitable oxidants not containing any heavy metals, like a tetrathionate, for instance sodium tetrathionate, may be applied. For sulphite, any sulphite of alkali metals or alkali-earth metals may be used.

An attendant but important advantage of the Bunte salts of keratin compared with the reduced keratin is that the Bunte salts react more rapidly.

The reaction with sulphite ions may be carried out with any kind of keratin, for instance cheap kinds of wool, like belly wool. Also recovered, old wool is applicable. These are cheap materials which, after treatment, have the desired adsorption capacity for the heavy metals. It is possible for the treatment to be carried out in such a manner that the fibre-structure of wool is preserved. This is of advantage to the application of the process according to the invention, since a strong permeable keratin bed can then be formed through which the solution to be treated can be passed well. The solution to be treated can also be mixed with the treated keratin in a finely divided state, by stirring. It may prove necessary for the material which contains the natural keratin to be degreased first prior to treatment.

Besides from wool, the adsorbent can also be obtained from other material consisting wholly or partly of keratin, like hair, horn, such as neat's horn, skin, or fowl's feathers. Especially chicken-feathers, preferably in a ground state, large quantities of which are being produced, are attractive on the basis of economic considerations.

It is noted that the binding of silver ions by means of wool is mentioned in a publication by Simpson, W. S., and Mason, P. C. R., Textile Res. Journ., 1969, pages 434–441. On page 440 reduction of wool followed by acetylation is mentioned, but with a negative result in relation to adsorption of the tested metal ions. In the German Patent Specifications Nos. 578,828, 588,710 and 662,647 mention is made of compounds of keratin derivatives and heavy metals. Said compounds are prepared for pharmaceutical purposes and are made to precipitate out of a solution. The processes are not suitable for removing heavy metals from solutions or gaseous mixtures on an industrial scale.

Suitable sulphur-containing reagents for binding heavy metals are also polyamides of which at least part of the amide groups has been replaced by thioamide groups.

The polyamides containing thioamide groups may be obtained by reaction of natural or synthetic polyamides with phosphorus pentasulphide. Suitable synthetic polyamides which may be started from are: polybutyrolactam (Nylon 4), polycaprolactam (Nylon 6), polyoenantholactam (Nylon 7), polyundecalactam (Nylon 11), polylaurinolactam (Nylon 12), polyhexamethylene-diamine-adipate (Nylon 66) and copolymers based on the monomers of said polyamides. Natural polyamides which may be started from are the albumin-like substances. Highly suitable are the keratin-containing materials feathers, horn, outer skin, hair and wool.

The polyamides part of whose amide groups has been replaced by thioamide groups are new substances. Starting from polycaprolactam a compound is obtained having the structure:

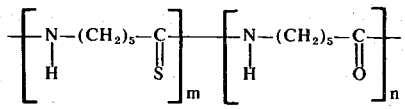

where $m$ and $n$ represent arbitrary numbers. Starting from polyamides other than polycaprolactam products are obtained in which, in a similar way, part of the amide groups has been replaced by thioamide groups. For the process according to the invention it is not objectionable if all amide groups of the polyamides have been replaced by thioamide groups.

For preparation of the reagent the more or less finely divided polyamide can, in any suitable non-aqueous solvent for the phosphorus pentasulphide, like xylene or carbon disulphide, be made to react therewith at an elevated temperature. The reaction temperature is dependent on the boiling point of the solvent, unless an elevated pressure is worked at. The reaction time is set in dependence on the amount of sulphur to be taken up and on the nature of the polyamide. A cheap starting material for carrying out the process according to the invention can be obtained by reacting the waste of polyamide-processing industries or fowl's feathers in finely divided state with the phosphorus pentasulphide.

The process according to the invention is highly suitable for binding heavy metals to the sulphur-containing reagent; notably antimony, arsenic, cadmium, chromium, germanium, gallium, gold, cobalt, copper, mercury, lead, manganese, molybdenum, nickel, palladium, platinum, radium, rhenium, rhodium, rubidium, thallium, thorium, tin, vanadium, tungsten, iron, silver, zinc, metals from the group of the rare earths and actinides, particularly cerium, europium and urane, can be suitably removed from a solution in this way. The optimum pH value for application of the process depends on the metal to be bound; in general, there is no objection against starting from an acid solution.

With application of the process according to the invention heavy-metal end-concentrations in solutions of less than 0.01 part by weight per million are attainable. This means that waste water which contains heavy metals and, hence, whose discharge on the surface waters is objectionable, like waste water from electroplating plants, from photodeveloping installations or from installations for electrolysis, can be converted through treatment with the sulphur-containing reagent into water which may be discharged without there being any objections in relation to environmental hygiene. Also surface water which is used for the supply of drinking water can be treated according to the present process.

It is also possible to bind vapours of heavy metals, for instance mercury vapour, from gaseous mixtures to the sulphur-containing reagent. In that case it is favourable if these compounds are somewhat moist.

By elutriation the metal may be recovered from the reagent which is loaded with heavy metal, although, in view of the cheapness of the material, it may certainly be warranted to destroy this, for instance through burning after drying, and to recover the metal from the residue in a known way. In case, for instance, mercury has been bound the metal may also be recovered from the combustion gases.

The invention will be elucidated with the aid of the following examples of realization, however without being limited thereto.

EXAMPLE I 50 g of wool were shaken for 3 days, at 20°C, with 12.5 g of tri-n-butylphosphine and 5 liters of 20 % by weight of n-propanol in water. The resulting reduced wool was washed with dilute acetic acid (10 % by weight), and dried at 45°C.

Part of the dry, reduced wool obtained was added to a glass 1.5 cm dia column, the bed height being 10 cm. 1 liter of the solution was led through the bed, which solution contained 3 parts by weight per million of mercury(II)-nitrate in water. Mercury could no longer be demonstrated to be present in the effluent (detection limit 0.01 part per million).

In a similar way, the metals could be removed from dilute aqueous solutions of, amongst others, copper(II)sulphate, lead(II)nitrate, silver(I)nitrate and gold(III)chloride.

The drying of the reduced keratin is not essential to the application envisaged.

EXAMPLE II 10 g of wool were added to an aqueous solution of 350 ml of 0.05 M sodium acetate and 250 ml of dioxane. Subsequently, 21.3 g of sodium sulphite in 100 ml of water were added, whose pH value had been brought at 7.5, and 4 g of sodium tetrathionate in 100 ml of water, whose pH value had also been brought at 7.5. The mass was then stirred for 12 hours. Next, the treated wool was separated from the liquid, washed with water and then washed with ethanol.

Part of the resulting dry, treated wool was added to a glass 1.5 cm dia column, the bed height being 10 cm. 1 liter of a solution was led through the bed, which solution contained 3 parts by weight per million of mercury(II)-nitrate in water. Mercury could no longer be demonstrated to be present in the effluent (detection limit 0.01 part per million).

In a similar way, the metals could be removed from dilute aqueous solutions of, amongst others, cobalt(II)sulphate, gold(III)chloride, copper(II)sulphate, lead(II)nitrate, nickel(II)sulphate and silver(I)nitrate.

The same results were obtained when starting from ground chicken-feathers.

EXAMPLE III

A 10 cm high bed of finely divided material was inserted in a glass 1.5 cm dia column, which material had been obtained by treating 50-denier polycaprolactam fibres with a solution of phosphorus pentasulphide in xylene at 100°C for such a time that the sulphur content of the polymer amounted to 11.9 %. 5 liters of a solution containing 5 parts by weight per million of lead(II)nitrate in water were led through the bed. Lead could no longer be demonstrated to be present in the effluent (detection limit 0.01 part by weight per million).

In a similar way, the metals could be removed from aqueous solutions of copper(II)sulphate, mercury(II)nitrate, silver(I)nitrate, gold(III)chloride and nickel(II)sulphate and cobalt(II)chloride.

Similar results were obtained with ground chickenfeathers treated in the same way, with phosphorus pentasulphide, as the polycaprolactam fibres.

We claim:

1. A process for removing heavy metals from solutions and gaseous mixtures which comprises:

a. contacting the solutions or gaseous mixtures with a sulphur-containing reagent selected from the group consisting of reduced keratin, Bunte salts of keratin, and natural or synthetic polyamides at least part of whose amide groups has been replaced by thio-amide groups, whereby the metals are bound to the reagent, and b. separating the loaded reagent formed in (a), wherein the Bunte salts of keratin are derived from keratin by treatment of the keratin in an aqueous medium with the aid of sulphite ions in which an oxidant is used to cause the reaction to go to completion and wherein the sulphite ions are derived from either alkali metal sulphites or alkaline earth metal sulphites and a tetrathionate is used as an oxidant.

2. The process of claim 1 wherein the natural or synthetic polyamides are obtained by the reaction of natural or synthetic polyamides with phosphorous pentasulfide.

3. The process of claim 1 wherein the natural or synthetic polyamides are selected from the group consisting of polybutyrolactam, polycaprolactam, polyoenantholactam, polyundecalactam, polylaurinolactam, polyhexamethylene-diamine adipate, copolymers on the basis of the monomers of these polyamides, fowl's feathers, horn, outer skin, hair and wool.

\* \* \* \* \*